United States Patent
Johansson et al.

(10) Patent No.: US 9,858,538 B1
(45) Date of Patent: Jan. 2, 2018

(54) ELECTRONIC CONCIERGE

(71) Applicant: Amazon Technologies, Inc., Reno, NV (US)

(72) Inventors: Jesper Mikael Johansson, Redmond, WA (US); Michelle Jacques Anschell, Kent, WA (US); Charles Ray Kelley, Bellevue, WA (US); Shalini Pothuru, Seattle, WA (US); Samuel Max Rossoff, Seattle, WA (US); Brad Ruppert, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 14/207,340

(22) Filed: Mar. 12, 2014

(51) Int. Cl.
| | |
|---|---|
| *G06Q 10/02* | (2012.01) |
| *G06Q 20/40* | (2012.01) |
| *G06Q 20/10* | (2012.01) |
| *G06Q 30/02* | (2012.01) |
| *G01C 21/00* | (2006.01) |

(52) U.S. Cl.
CPC ............ *G06Q 10/02* (2013.01); *G01C 21/00* (2013.01)

(58) Field of Classification Search
CPC .... G06Q 50/01; G06Q 30/0269; G06Q 10/06; G06Q 30/0271; G06Q 30/0251; G06Q 10/1093; G06Q 10/1095; G06Q 30/0261; G06Q 30/0205; G06Q 30/02; G06Q 30/0631; G06Q 30/0255
See application file for complete search history.

(56) References Cited

U.S. PATENT DOCUMENTS

| | | | |
|---|---|---|---|
| 2008/0046298 A1 | 2/2008 | Ben-Yehuda et al. | |
| 2013/0238370 A1* | 9/2013 | Wiseman | G06Q 10/02 705/5 |
| 2014/0344718 A1* | 11/2014 | Rapaport | H04L 51/32 715/753 |
| 2015/0324751 A1* | 11/2015 | Orenstein | G06F 19/3481 702/3 |

FOREIGN PATENT DOCUMENTS

| | | |
|---|---|---|
| EP | 2541484 A1 | 1/2013 |
| WO | WO2013041517 A1 | 3/2013 |

\* cited by examiner

*Primary Examiner* — Maroun Kanaan
(74) *Attorney, Agent, or Firm* — Lee & Hayes, PLLC

(57) ABSTRACT

This disclosure is directed to techniques, systems, and apparatuses to provide electronic concierge services and information to one of more users, as well as perform other operations related to planning one or more activities. Concierge services may include providing information about activities, recommending activities, arranging travel, and other related tasks. The electronic concierge may access and use personal information about the user (or group of users) to determine the activities that may be of interest to the user, and possibly to a group of users. The personal information may include transaction history, user settings, past user activity, social network information, and/or other types of information. The electronic concierge may receive other inputs such as a time period to undertake activities, a number of participants, an identity of the participants, and so forth. In some embodiments, the electronic concierge may arrange transportation, purchase tickets, make reservations, and/or provide other assistance.

21 Claims, 7 Drawing Sheets

ELECTRONIC CONCIERGE

BACKGROUND

When traveling for pleasure, business, or other purposes, people often require assistance in determining information about a current location, dining options, entertainment options, and other types of information. Some hotels have traditionally staffed concierges to assist guests and provide basic information and services. However, traditional concierges have limited knowledge about preferences of the guests and possibly about other information that may be important to the guest. Further, concierges or other people providing information are not available at a moment's notice to provide updated information.

Planning activates with a group of people can be difficult when trying to accommodate everyone's preferences, coordinate schedules, disseminate information, and share costs. Often, group planning is performed by negotiations that require a fair amount of time, require decision making by participants, and often fail to fairly represent each participant's interests.

Computing devices have become commonplace in almost every environment. For example, mobile telephones, laptop computers, and tablet computers are commonly used for work and pleasure and accompany people in many daily activities. For example, people often travel with computers and mobile phones, bring these devices to school, and use these devices in public places.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
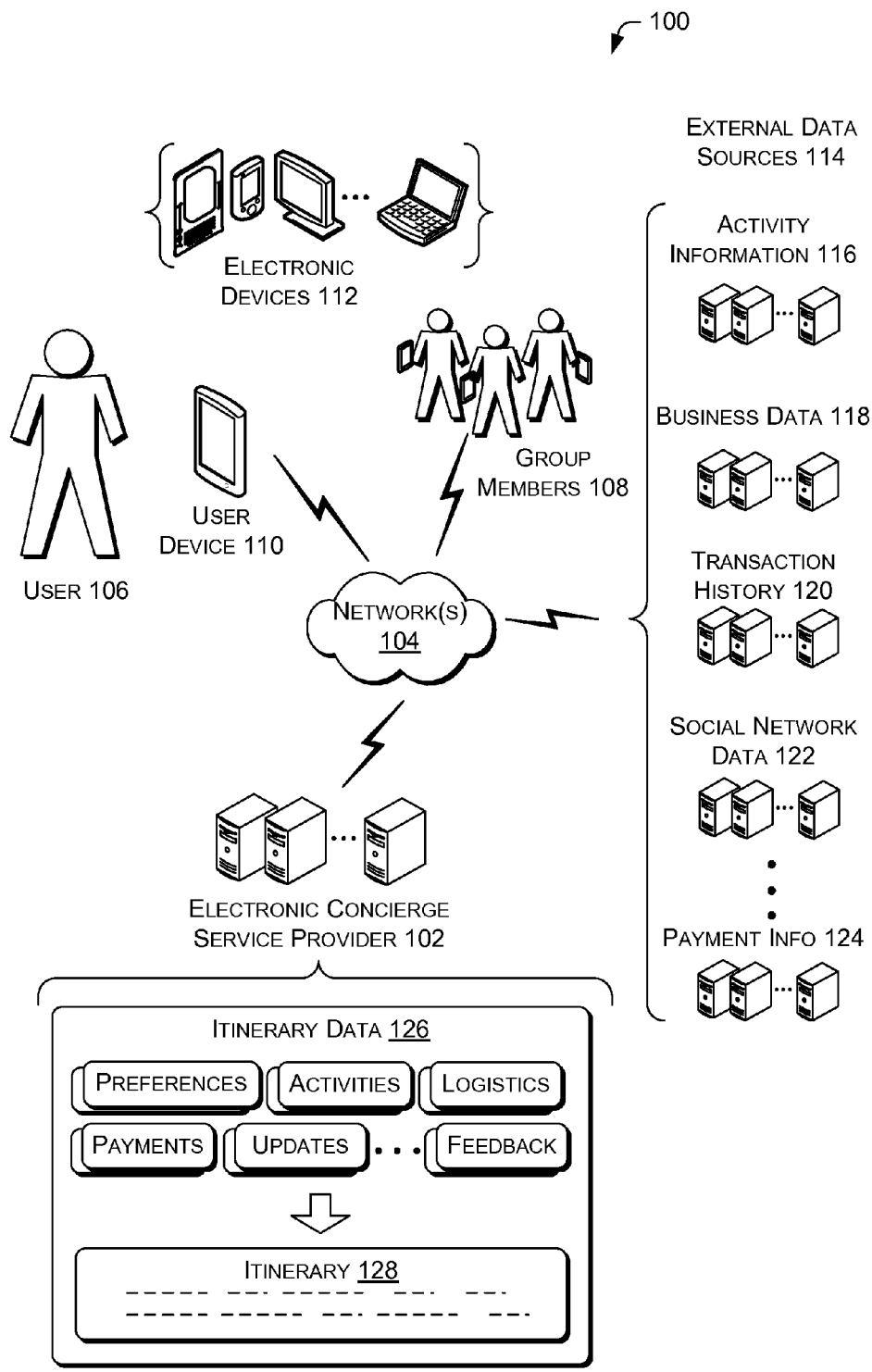
FIG. 1 is a schematic diagram of an illustrative computing environment to provide an electronic concierge.

This disclosure is directed towards providing electronic concierge services and information to one of more users, as well as perform other operations related to planning an activity. Concierge services may include providing information about activities (e.g., entertainment, food venues, or landmarks), recommending activities, arranging travel, and other related tasks. For example, a user may be visiting a particular city and may have a few hours of free time. The user may input a request to the electronic concierge to determine activities (e.g., events or sightseeing) to perform or take part in during the few hours of free time.

The electronic concierge may access and use personal information about the user (or group of users) to determine the activities that may be of interest to the user, and possibly to a group of users. The personal information may include transaction history, user settings, past user activity, social network information, and/or other types of information available about the user that may or may not explicitly indicate preferences of the user without additional processing and analysis. The electronic concierge may receive other inputs such as a time period to undertake activities, a number of participants, an identity of the participants, and so forth.

The electronic concierge may access information via one or more repositories, such as local resources, user reviews, weather information, and so forth to determine one or more activities. For example, the electronic concierge may use bots or crawling software to identify current activities for particular areas, obtain feedback on these activities, and maintain a repository of the activities including relevant information about the activities and availability of the activities. Activities may include performances, festivals, shows, and/or other limited or regularly available activities. The electronic concierge may then recommend one or more activities for the user or group of users. In some embodiments, the user or group of users may select one or more activities or otherwise accept recommendations from the electronic concierge. The electronic concierge may create an itinerary based on accepted activities, which may include an order of the activities, a time for at least some of the activities, and/or other related information, as further described below. In some embodiments, the electronic concierge may create contingency activities or plans, which may be used to modify an itinerary during execution of the itinerary. For example, if the users decide to participate in an activity longer than an allocated amount of time, the electronic concierge may modify a subsequent activity, cancel a subsequent activity, or replace a subsequent activity.

In some embodiments, the electronic concierge may arrange transportation, purchase tickets, make reservations, and/or provide other assistance to help the user or group of users prepare for the activities and may assist the user or group of users during execution of the itinerary (e.g., during an outing). For example, the electronic concierge may provide a list of items that are helpful for the activities, such as types of clothing and/or gear. The electronic concierge may provide assistance during the execution of the itinerary, such as by providing travel information (e.g., reserving a taxi, providing a bus schedule, etc.), maps, reminders, hints, answers to questions, rerouting information, modifications to the itinerary, and/or other types of assistance. The electronic concierge may request feedback from participants during or after activities to collect to better assist the participants during the execution of the itinerary or for other itineraries and/or for the benefit of other users.

In some embodiments, the electronic concierge may provide payment assistance for the user or group of users to allow payment for tickets, events, travel (e.g., taxis or bus fare), splitting or sharing of bills between users, tips, and other payment services. The electronic concierge may access stored payment accounts and use these payment accounts to execute payments to various entities to enable the user or group of users to participate in the activities in the itinerary.

The techniques, systems, and devices described herein may be implemented in a number of ways. Example implementations are provided below with reference to the following figures.

Illustrative Environment

FIG. 1 is a schematic diagram of an illustrative computing environment 100 to provide an electronic concierge. As shown, the environment 100 includes an electronic concierge service provider 102 ("electronic concierge"). The electronic concierge 102 may be hosted by one or more computing devices and may communicate with other computing devices via one or more networks 104. The networks 104 may include wireless and wired networks, including mobile telephone networks, wide area networks, and so forth. In some embodiments, the service provider 102 may be operated by or associated with an electronic commerce system.

The electronic concierge 102 may communicate with one or more user devices associated with one or more users, which may include a user 106 and may possibly include group members 108, which may be participants in one or more activities with the user 106. In some instances, the user 106 may be a primary user that initiates interaction with the electronic concierge, coordinates actions of the group members 108, and/or performs other actions to assist the group members 108 in performing one or more activities. The user 106 may use a user device 110 to communicate with the electronic concierge 102 while the group members 108 may use electronic devices 112 to communicate with the electronic concierge 102. The user device 110 may be one of the electronic devices 112, which may include virtually any type of electronic device or computing device that can exchange information with another device. The electronic devices 112 may comprise one or more of mobile telephones, smart telephones, augmented reality devices, notebook computers, tablets, gaming consoles, set top boxes, televisions, desktop computers, music players, watches, electronic book (eBook) reader devices, vehicle computing devices, kiosks, and/or other types of electronic devices. While the electronic concierge 102 may communicate with multiple devices associated with multiple users to coordinate activities of the users, the electronic concierge 102 may assist a single user (e.g., the user 106) that plans activities for oneself and without input from other users. The electronic concierge 102 may provide data to the electronic devices 112 through a browser, a dedicated application or "app", and/or through messaging services such as short message service (SMS), email, and other messaging services.

The electronic concierge 102 may communicate with external data sources 114 to access various types of information, which may be used to assist the user 106 and/or the group members 108 as discussed above. The external data sources 114 may include activity information 116, business data 118, transaction history 120, social network data 122, and/or payment information 124, among other possible sources of information. The external data sources 114 may be accessible via the Internet and/or other public or private data repositories.

The activity information 116 may include information about activities that is collected from published notifications about the activities, user reviews, user recommendations, websites, travel articles, and so forth. The activity information 116 may include places to visit, food venues, performances, landmarks, and/or other activities.

The business data 118 may include information provided by businesses, services, or others entities or people to facilitate activities. The business data 118 may include transportation options and services, which may be booked or obtained on behalf of the user 106 or group members 108 by the electronic concierge 102, food venues, shows, performances, and so forth. The business data 118 may be used to facilitate performance of activities in addition to determining information about activities.

The transaction history 120 may include data about previous actions of the user 106 and/or the group members 108. The previous actions may include previous activities planned and executed (or possibly not executed), purchased items from an electronic marketplace, browsed items from an electronic marketplace, prior travel, and/or other types of data that may be used to indicate preferences of the user. The transaction history 120 may also include explicit user preferences, such as types of food that the user likes, preferences for travel modes, and so forth. However, this type of information may be extracted from past recorded activities of the user 106 or the group members 108.

The social network data 122 may include activities and indications of preferences of activities for the user 106 and/or the group members 108. For example, the social network data 122 may be used to identify activities engaged in by contacts of the user 106 and/or the group members 108. The social network data 122 may further indicate, directly or indirectly, preferences of the user, such as by information accessed by the user 106, a length of the access, contacts' interactions, and so forth.

The payment information 124 may include payment instruments and/or access to payment accounts that may be used to pay for activities, pay for travel, share costs, and make other types of payments. In some embodiments, the payment information 124 may also be used to verify an identity of one or more user.

In various embodiments, other types of data may also be accessed by the electronic concierge 102 including information available via the Internet and/or other public and/or private repositories of information.

The electronic concierge 102, in response to communications with the user 106, the group members 108, and/or the external data sources 114, may generate itinerary data 126. The itinerary data 126 may include preferences, which may be inferred from various accessed data discussed above. The itinerary data 126 may include recommended activities, logistics (e.g., dining options or travel options), payment information and access passes, updates, feedback, and/or other relevant information to enable the user 106 and/or the group members 108 to participate in one or more activities, provide input associated with the activities, and ultimately enjoy the activities. The itinerary data 126 may be used to generate an executable itinerary 128 that can be executed or otherwise participated in by the user 106 and/or the group members 108, possibly in response to compilation of the itinerary data 126 and/or user selections. The itinerary 128 may include planned and selected activities, times for the activities (which may be adjusted in advance or during the activity), and possibly alternative or contingency activities, among other possible content and information.

Illustrative Computing Architecture

Figure 2:
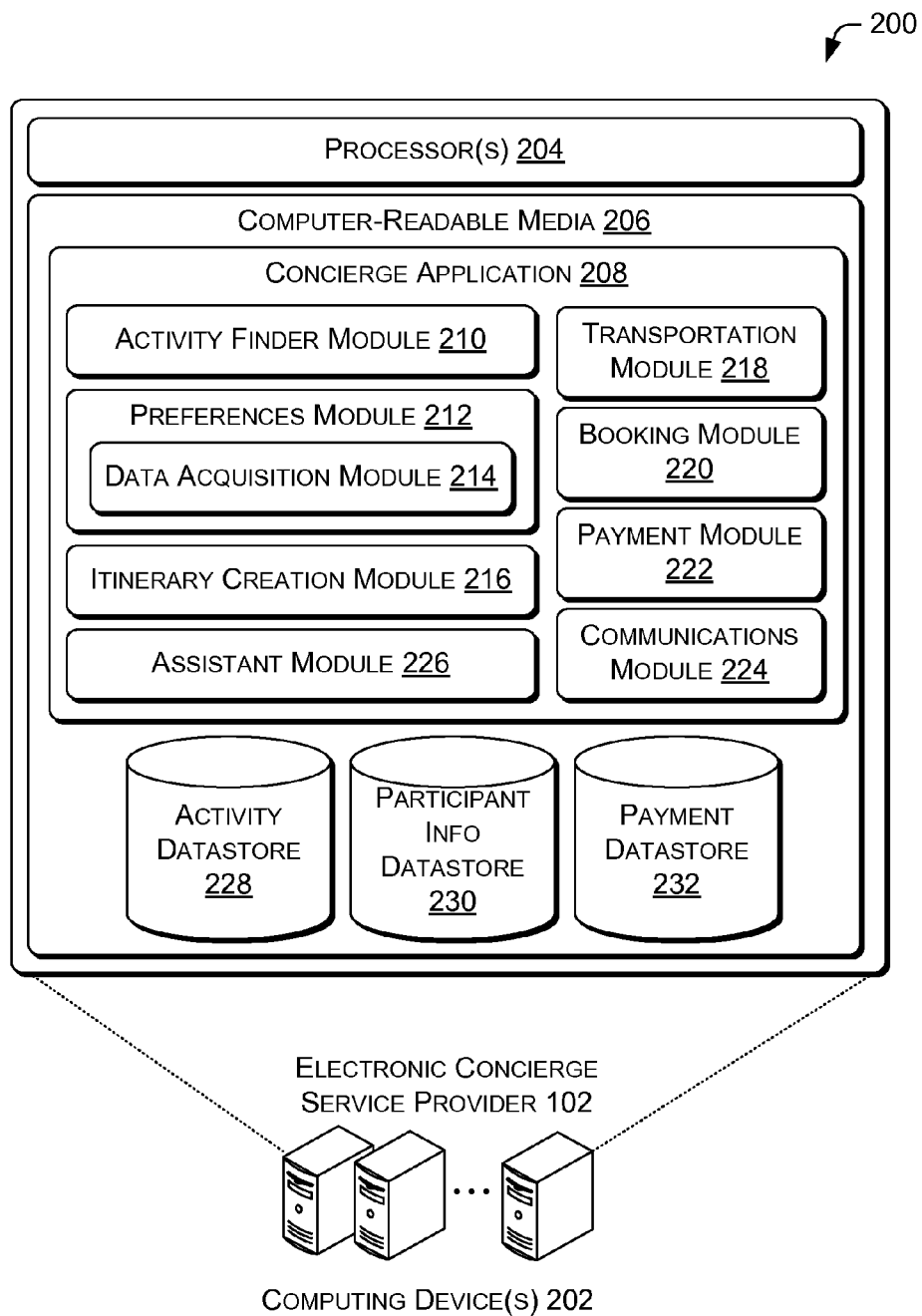
FIG. 2 is a block diagram of an illustrative computing architecture to provide an electronic concierge by an electronic concierge service provider.

FIG. 2 is a block diagram of an illustrative computing architecture 200 to provide an electronic concierge by an electronic concierge service provider. The computing architecture 200 may include one or more computing devices 202 that may be implemented in a distributed or non-distributed computing environment.

The computing devices 202 may include one or more processors 204 and one or more computer-readable media 206 that stores various modules, applications, programs, or other data. The computer-readable media 206 may include instructions that, when executed by the one or more processors 204, cause the processors to perform the operations described herein for the electronic concierge 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 206 may store a concierge application 208. The concierge application 208 may include various modules, which may include an activity finder module 210, a preferences module 212, a data acquisition module 214, an itinerary creation module 216, a transportation module 218, a booking module 220, a payment module 222, a communications module 224, and an assistant module 226, which are described in turn. The modules may be stored together or in a distributed arrangement. In some embodiments, the modules may represent services that may be performed using components that are provided in a distributed arrangement, such as by virtual machines running in a cloud computing environment. In addition, one or more datastores may be included in the computing architecture 200 and/or accessible by the computing devices 202, and may include an activity datastore 228, a participant datastore 230, and a payment datastore 232.

The activity finder module 210 may identify, classify, rank, and otherwise track activities available for participation by the user 106 and/or the group members 108. The activities may include entertainment activities, education activities, food venues, music, landmarks, museums, shopping locations, parks, public spaces, private spaces, and so forth. The activity finder module 210 may identify the activities by collecting information from websites, travel publications, user reviews, blogs, social network sites, and/or other repositories that provide information about activities. The activity finder module 210 may access the activity information 116 and/or the social network data 122 to obtain activity information, for example. The activity finder module 210 may store the activity information in the activity datastore 228. The activity information may include information about activities, such as a description, a rating, a price, a length of time for a typical visit, a preferred season or timeframe, open/close times, and other relevant information. The activity finder module 210 may classify and/or rank the activities based on researched data and/or feedback from other users that engaged in the activity (possibly via the electronic concierge).

The preferences module 212 may determine preferences for a user. The preferences may be preferences for activities, lodging, transportation, meals, beverages, and so forth. The preference module 212 may determine preferences of the user 106 and/or group members 108 from direct input (selections by participants) and/or by inferring preferences from other data associated with the participants. In various embodiments, the preferences module 212 may analyze and leverage historical data accessed by the data acquisition module 214 to determine preferences. The preferences module 212 may identify types of activities that are associated with the user based on the historical data, such as user transaction history, social media interaction, listed preferences, past use of the electronic concierge 102, and so forth. The user preferences may be stored in the participant datastore 230. As an example, the preferences module 212 may determine types of restaurants that a user may like based on types of books the user purchased about food or from recipes the user accessed from an electronic repository. As another example, user preferences may be based on types of media such as movies, music, and books a customer consumes. The activity finder module may use an external data source to find out whether any of the favorite movies, music, or books has ties to the current location. This information could be used to generate interest content, which may be presented as follows: "Did you know that your favorite author/director grew up in this city?" or "Check out the house he/she grew up in and his/her favorite coffee shop."

The preferences module 212 may determine transportation preferences based on received input from the user and/or from analyzing payment account statements for transportation expenditures. The preferences module 212 may determine activity preferences based on an analysis of user behavior on a social network.

The data acquisition module 214 may access historical information about the user 106 and/or the group members 108 to enable the preferences module 212 to extract user preferences and other information that may assist in recommending activities to the user and/or group members. In some instances, some or all of the historical information may be stored in the participant datastore 230. The historical information may be transaction history and may include purchases and/or browsing history associated with an electronic marketplace. Transaction history may include locations that the user has "checked-in" at using social networking software or other software and/or other location information such as global position system (GPS) related information. Other examples of transaction history may include prior interaction with the concierge application 208, prior travel information, social network information, and/or other data a participant has enable the data acquisition module to access.

In some embodiments, the data acquisition module 216 may determine from participant data that the user 106 and/or one or more of the group members 108 may have a friend or contact in a location being visited. The preferences module 212 may enable inviting the friend/contact to join an itinerary. For example, if the user 106 visits Atlanta, the preferences module 212 may alert the user 106 of a friend that lives in Atlanta or is visiting Atlanta at a same time as the user 106. The friend's location may be discovered by analysis of the social network data 122 or electronic calendar data, for example. The friend may become a participant in the itinerary or at least a part of the itinerary.

The itinerary creation module 216 may determine basic information from the user 106 and/or the group members 108, such as who is participating in an itinerary, a planned location of the user and/or group members, a time frame, and/or what type of activities the user and/or group members wish to engage in, among other possible preliminary questions. In some embodiments, the itinerary may include sub-itineraries, which may include different participants and different time frames. For example, some additional participants may join the user 106 for part of the itinerary, which may be referred to as a sub-itinerary. The activities may be filtered by a category and/or other criteria, which may be input by the user 106 and/or the group members 108. For example, the user 106 may specify that she desires to engage in outdoor activities that are free of cost or the group members 108 desire to enjoy an evening of sampling local food and beverages. Typically a single group member may enter information on behalf of the group. The group members 108 (including the user 106) may be linked together via the concierge application 208 when creating an itinerary.

In accordance with one or more embodiments, the itinerary creation module 216 may identify activities from the activity datastore 228 (or possibly from further searching) that meet the input criteria and are associated with the user 106 and/or the group members 108 based at least on data generated by the preferences module 212 that may be stored in the participant datastore 230. The itinerary creation module 216 may present one or more activities to the user and/or the group members for selection, vote, or for another decision making process. The itinerary creation module 216 may schedule selected activities and determine logistics for travel, food, rest, and so forth. The itinerary creation module 216 may use the transportation module 218 to determine preferences for travel, and thus determine time allowances and/or other considerations for travel. The itinerary creation module 216 may provide the itinerary to the user/group members. As discussed above, the itinerary creation module 216 may create sub-itineraries that include different participants for different time ranges. Thus, the user 106 may have participants join and/or leave during execution of a main itinerary that includes one or more sub-itineraries. The sub-itineraries may allow a portion of the group members 108 to participate in an alternative activity and then possibly rejoin the other group members 108, for example.

The transportation module 218 may determine travel options for participants based on available transportation options, determined preferences of the participants, and other information such as geographical information. For example, the transportation module 218 may recommend walking to an activity when the activity is located in a close proximity to the user, but may also provide or consider other options such as taxis, bicycle rentals, and other options that may also be convenience for short distance travel. When the travel involves longer distances, the transportation module 218 may exclude options like walking and use of bicycles, for example. The actual selection of a transit mode from possible options may be based on the user's/group members' preferences. The transportation module 218 may determine estimated times for each type of transit, which may be used by the itinerary creation module 216. The transportation module may also obtain transportation, such as by accessing bus/train schedules, scheduling a taxi, hiring a driver, and so forth. For example, the transportation module 218 may book transit from a transportation service, such as a cab or hire a driver, for the user or group members by causing the payment module 222 to deposit funds in an account associated with the transportation service.

The booking module 220 may secure admission rights, reservations, tickets, access passes, and/or other rights for the participants to enjoy the activities. For example, when the itinerary includes a visit to the zoo, the booking module 220 may order advance admission tickets for the user/group members from a website of the zoo or other electronic ticket provider or service using the payment module 222.

The payment module 222 may obtain access to payment accounts and/or payment instruments of the user 106 and/or the group members 108, which may be accessible via the payment datastore 232. The payment module 222 may facilitate providing payments on behalf of the user/group members for activities, transportation, food, tickets, gear, and/or other expenses. The payment module 222 may be configured to handle payment locally (e.g., the service provider 102 is run by a bank or transaction processor) or send payment transactions to a third party for handling (e.g., a transaction processor). In some embodiments, the payment module 222 may assist the group members in dividing or sharing payments such as to split a single bill at a restaurant or split a group rate on an activity. For example, the payment module 222 may split the amount due by the number of participants sharing the amount due, and then charge the individual participants a resulting share of the total amount, such as by using the techniques described in co-assigned U.S. patent application having Ser. No. 14/034,285, which is incorporated herein by reference in its entirety. The payment module 222 may be used with the transportation module 218 and/or the booking module 220 such as to book travel, purchase advance tickets, purchase admission tickets or make other payment on behalf of the user and/or the group members in order to execute the itinerary.

The communications module 224 may provide communications and/or other data to the user and/or group members to facilitate the collection and distribution of data, such as account data, payment information, feedback, preferences, and/or other types of information from the user 106 and/or the group members 108224. The communications module 224 may obtain feedback from the user/group members about activities and/or other aspects of an itinerary during or after execution of the itinerary. The communications module 224 may use this information to adjust the itinerary, such as by causing an update, removal, or replacement of subsequent activities in the itinerary. The communications module 224 may provide this information to other users to facilitate selection of activities or for other purposes. In some embodiments, the communications module 224 may request feedback from the user/group members immediately following a scheduled end of an activity. The communications module 224 may determine that the user/group members want to extend an activity, and may then cause modification of the itinerary accordingly in response to a request to extend the activity. For example, the communications module 224 may determine that the user/group members want to extend an activity based on input received from the users, based on location data (e.g., assume they want to stay because they have not left the activity), and/or based on other data. In some embodiments, the communications module 224 may facilitate communications with the user 106 and/or the group members 108 via a messaging service, a dedicated application, and/or through other software, such as a browser. For example, the communications module 224 may facilitate identifying and transmitting a request to a first user to obtain an item for a second user when the first user is identified as being located near a store that sells the item needed by the second user. The communications module 224 may be used by other modules described herein to provide related communications.

The assistant module 226 may provide maps, translations, updates, reminders, and/or other information to the user/ group members before and/or during execution of the itinerary (e.g., during the outing involving the activities). For example, the assistant module 226 may provide directions for a taxi driver so that the taxi driver can drive the user/group members to a next activity in the itinerary. The assistant module 226 may provide translation services to assist the user in ordering food or purchasing an item, for example. The assistant module 226 may create a list of items that are helpful for an activity so the user/group members can pack these items in advance of the activity or obtain the item(s) before the activity. In some embodiments, the assistant module 226 may assist the user/group members in obtaining any helpful items, such as by ordering the item(s) from an electronic marketplace in advance and scheduling delivery before the activity takes place, such as delivery at a hotel or nearby delivery locker. The assistant module 226 may provide reminders to the user/group members before or during execution of the itinerary, such as to notify the user/group members of a next activity, a location to travel to, and so forth. The assistant module 226 may assist in modification of an itinerary such as to extend an activity, cancel an activity, replace an activity or otherwise modify the itinerary.

Functionality the electronic concierge 102 and the various modules described above are described in further detail below with respect to illustrative operations. However, the electronic concierge 102 and the various modules described above may be used to perform other operations in addition to those described below.

Illustrative Operation

FIGS. 3-7 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
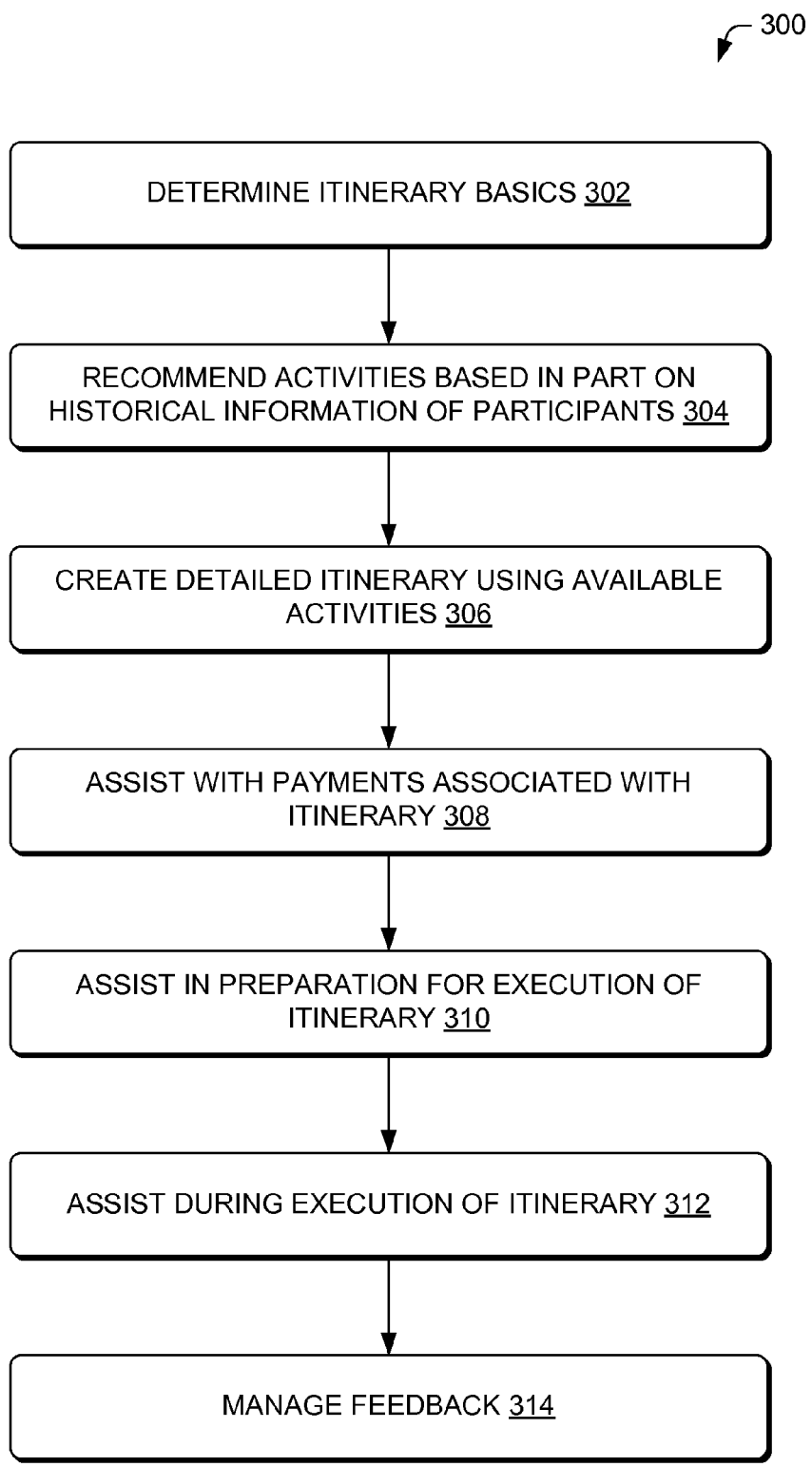
FIG. 3 is a flow diagram of an illustrative process to provide basic features of an electronic concierge.

FIG. 3 is a flow diagram of an illustrative process 300 to provide basic features of an electronic concierge. The process 300 is described with reference to the environment 100 and may be performed by the computing architecture 200. Of course, the process 300 may be performed in other similar and/or different environments.

At 302, the itinerary creation module 216 may determine basic information from the user 106 and/or the group members 108 to form the itinerary. The basic information may include one or more of a location (e.g., a city, town, state, etc.), a region, or a geographic area. The basic information may include time parameters, such as a date, available times of a day or days, or other time parameters. The basic information may include a budget or cost constraints. The basic information may also include criteria and/or categories of activities of interest to the user/group members. For example, the user may specify that she wants to sample local restaurants of pubs that she desires to visit local landmarks, or that she desires to participate in a combination of different types of activities (e.g., some shopping, some museums, some food venues, etc.).

At 304, the itinerary creation module 216 may access information obtained by the data acquisition module 214 to recommend activities based in part on historical information of participants, such as the user 106 and the group members 108. In some embodiments, the data acquisition module 214 may use at least some of the basic information obtained at the operation 302 to query historical user information, such as the participant information datastore 230 to identify possible activities of interest for the user. The itinerary creation module 216 may then use this information to identify activities from the activity datastore, which may then be recommended to the user. For example, the data acquisition module 214 may determine types of food that the user 106 enjoys based on past transactions of the user from previous visits to restaurants. In this example, the data acquisition module 214 may determine that the user enjoys Italian food and Thai food, for example. The itinerary module may then use this information to find Italian and Thai restaurants that the user may enjoy in the specified location from the operation 302.

In some embodiments, the itinerary creation module 216 may create sample itineraries or lists of activities for different categories based on known or discoverable interests of the user or the group members. For example, the user may be presented with recommended itineraries of different types or categories, which the user can then choose from. Sample itineraries may be categorized with specific categories (e.g., sports outing, dining outing, sight-seeing outing, unique Boston landmarks, etc.) or may be categorized with other types of categories (e.g., active outing, low-key outing, social outing, girl outing, guy outing, date outing, etc.).

At 306, the itinerary module 306 may create a detailed itinerary using available activities, possibly after input or selection of recommended activities by the user and/or the group members. For example, the user may select activities from a list, the group members may vote on activities, or activities may be selected in other ways. The itinerary module 306 may order the activities, determine time periods for respective activities, determine and arrange modes of travel for the user/group members, determine breaks between activities (e.g., a break at a hotel to change clothing or rest), determine meal times or snack times, and/or plan or suggest other elements of the itinerary.

At 308, the payment module 222 may assist in payments associated with execution of the itinerary. For example, the payment module 222 may order and/or reserve tickets for a show, reserve a table at a restaurant, allocate costs of a group activity among participants of the activity, and/or make other types of payments. In some embodiments, the payment module 222 may order and pay for items that are helpful to execute an activity, such as order gear, clothing, or other special items for an event. For example, when the user decides to go skiing and does not have the appropriate clothing, then the payment module 222, in cooperation with the assistant module 226 may locate and pay for rental gear, which may be reserved for the user in advance, for example. The payment module 222 may make payments using credit cards or other payment instruments that are associated with the user/group members, via online marketplaces and/or by causing deposit of funds into specified accounts. For example, the electronic concierge 102 may have prearranged agreements with some service providers, such as transportation services that allow payment of services by deposit of funds into specified accounts without use of a web payment portal or other publically available account.

At 310, the assistant module 226 may provide assistance to the user 106 and/or group members 108 before execution of the itinerary. The assistant module 226 may identify items that are helpful for the itinerary (e.g., a packing list of clothing, gear, and other items), information about what to expect during the activities, maps, and other advance information and/or materials. As discussed above, the assistant module 226 may cooperate with the payment module 222 to obtain some items, such as tickets, gear, or other information.

At 312, the assistant module 226 may assist the user 106 and/or the group members 108 during execution of the itinerary, such as during, between, and/or after the activities. The assistant module 226 may provide reminders, cancel/replace activities, shorten/lengthen activities, provide location information for a next activity or for transit to a next activity, and so forth. In some embodiments, the assistant module 226 may provide information during an activity, such as a guided walking tour of an area, information on highest rated parts of an activity (e.g., most famous paintings in a museum, most popular stores in a shopping center, or best items on a menu).

At 314, the communications module 224 may obtain feedback from the user and/or the group members during and/or after participation in activities. The communications module 224 may solicit direct feedback, such as by use of ratings, reviews, or other inputted feedback, or may obtain feedback without user input, such as recording a length of time at an activity or at a location, possibly using GPS information and/or other information to infer feedback.

Figure 4:
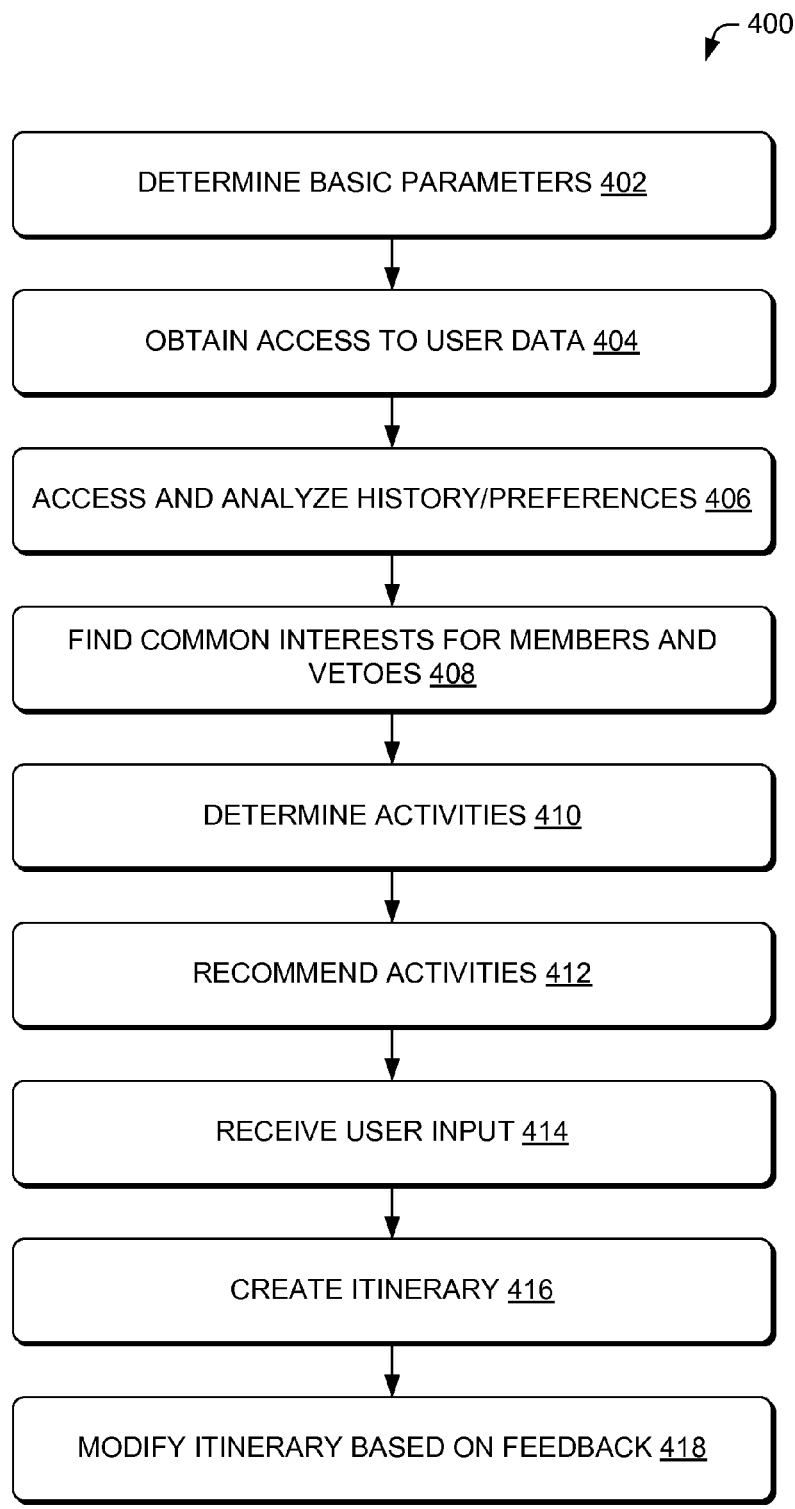
FIG. 4 is a flow diagram of an illustrative process to create an itinerary using the electronic concierge.

FIG. 4 is a flow diagram of an illustrative process 400 to create an itinerary using the electronic concierge. The process 400 is described with reference to the environment 100 and may be performed by the computing architecture 200. Of course, the process 400 may be performed in other similar and/or different environments.

At 402, the itinerary creation module 216 may determine basic parameters for creation of an itinerary. The itinerary creation module 216 may determine the basic parameters based on inputs received from the user 106 and/or the group members 108, and/or from information provided by devices associated with the user/group members. For example, a parameter may be a location, which may be determined as a current location based on a question from the user (e.g., "what is there to do here for the next hour?"), when GPS location information or location beacon information indicates that the user in located in a specific city, shopping center, or other specific area. Other parameters include time ranges, budgets, number or people, activity preferences, criteria, categories, age restrictions, and other parameters used to select activities for an itinerary.

At 404, the data acquisition module 214 may obtain access to user data, such as transaction data from previous interactions with the electronic concierge 102, from interactions with electronic marketplaces, social networks, and other data repositories. The data acquisition module 214 may acquire access after obtaining consent and appropriate access permissions.

At 406, the data acquisition module 214 may access and analyze historical information about the user 106 and/or the group members 108 to determine user preferences for selection of activities and for other decision making associated with creating the itinerary, selecting activities, determine travel mode preferences, food preferences, and other preferences. In some embodiments, the data acquisition module 214 may access the user information in advance to build profiles of the user and store the profile or data for a profile in the participant information datastore 230. In some embodiments, the data acquisition module 214 may determine or predict tolerances of users, such as how late the users like to stay out, how early they like to start activities, their tolerance of crowds, preferred duration of activities, and other tolerances for participants.

At 408, the itinerary creation module 216 may identify common interest of multiple users, such as common interest of the group members. The itinerary creation module 216 may also determine vetoed preferences, such as preferences that one or more users strongly dislikes or is unable to participate in for any number of reasons. Examples of vetoes may include selection of a restaurant that does not offer vegetarian meals when one of the participants is a vegetarian or a selection of a club/bar when one of the participants is under the legal age limit to gain access to the club/bar.

At 410, the activity finder module 210 may determine local activities in a specified area as possible activities for the user and/or group members to participate in. The activity finder module 210 may populate the activity datastore 228 with activities and metadata to enable a search of activities using parameters.

At 412, the itinerary creation module 216 may recommend activities based at least partly from results of the operations 402, 408, and 410. The itinerary creation module 216 may create recommended activities as full itineraries and/or as individual activities that are not yet scheduled as an itinerary. The recommendations may include access to other user's feedback, which may have been collected by the communications module 224 and/or by other resources. For example, the recommendations may be created by filtering candidate activities using geographic information, time range information, user preferences, and/or other information, thus using collaborative filtering. In some embodiments, the recommended activities may be ranked using a ranking algorithm that considers geographic information, time range information, user preferences, and/or other information. The candidate activities may be activities that are known to take place in a geographic area and/or during the time range of the trip. Other information that may be used to recommend the activities may include user rating data, price information, availability of tickets, distance or location within the geographic area, and so forth.

In some embodiments, the recommendations may be presented, in part, with images that the user can review to quickly evaluate an activity. For example, the user may be presented with a plurality of images, which may represent recommended activities. The user may then interact with the images, and possibly with other data to learn about the activities and/or select activities.

At 414, the itinerary creation module 216 may receive user input to select activities, vote for activities, or otherwise determine the activities. In some embodiments, the selection may be for a recommended itinerary of activities when the recommendations are formed as recommended itineraries rather than as recommended activities.

At 416, the itinerary creation module 216 may create or finalize the itinerary based on the input and/or result of the operation 414. For example, when votes are used, the itinerary creation module 216 may tally votes and select winning activities.

At 418, the assistant module 226, possibly using information from the communications module 224, may enable modification of the itinerary during execution of the itinerary, such as when the user and/or group members desire to shorten/lengthen an amount of time of an activity, cancel an activity, replace an activity, and/or make other modifications to the itinerary. The assistant module may determine a change to the activity based on user input, monitoring a location of the user, and/or by using other information received from the user or that is not received from the user (e.g., recognizing a lack of response by a user to accept next activity).

In accordance with some embodiments, the itinerary creation module 216 may interface with the social network data 122 to share an itinerary using one or more social networks. The itinerary creation module 216 may invite others to join the itinerary, such as through an invitation via the one or more social networks. The itinerary creation module 216 may solicit feedback on a created itinerary via the one or more social networks, possibly in addition to requesting feedback from participants about the itinerary. As discussed herein, the social networks may include repositories that allow users to share information, broadcast messages, share text and images, and perform other social interactions by exchanging electronic media. As an example, the itinerary creation module 216 may create an itinerary and post the itinerary via one or more social networks for "public comment" by friends and/or contacts of the user/group members associated with the itinerary. The itinerary creation module 216 may receive feedback and comments, provide the feedback/comments to the user/group members, and revise the itinerary based at least in part on the feedback and comments, possibly in response to action by the user/group members. In another example, the service provider 102 may add a participant that requests to join the itinerary via the one or more social networks, possibly after approval by the user/group members. The service provider 102 may add the participant, and adjust aspects such as transportation, reservations, and so forth as necessary to accommodate the additional participant. In another example, the itinerary creation module 216 may invite others to join an itinerary when a minimum number of participants has not yet been reached, such as to obtain a group discount or access another limited type of event.

Figure 5:
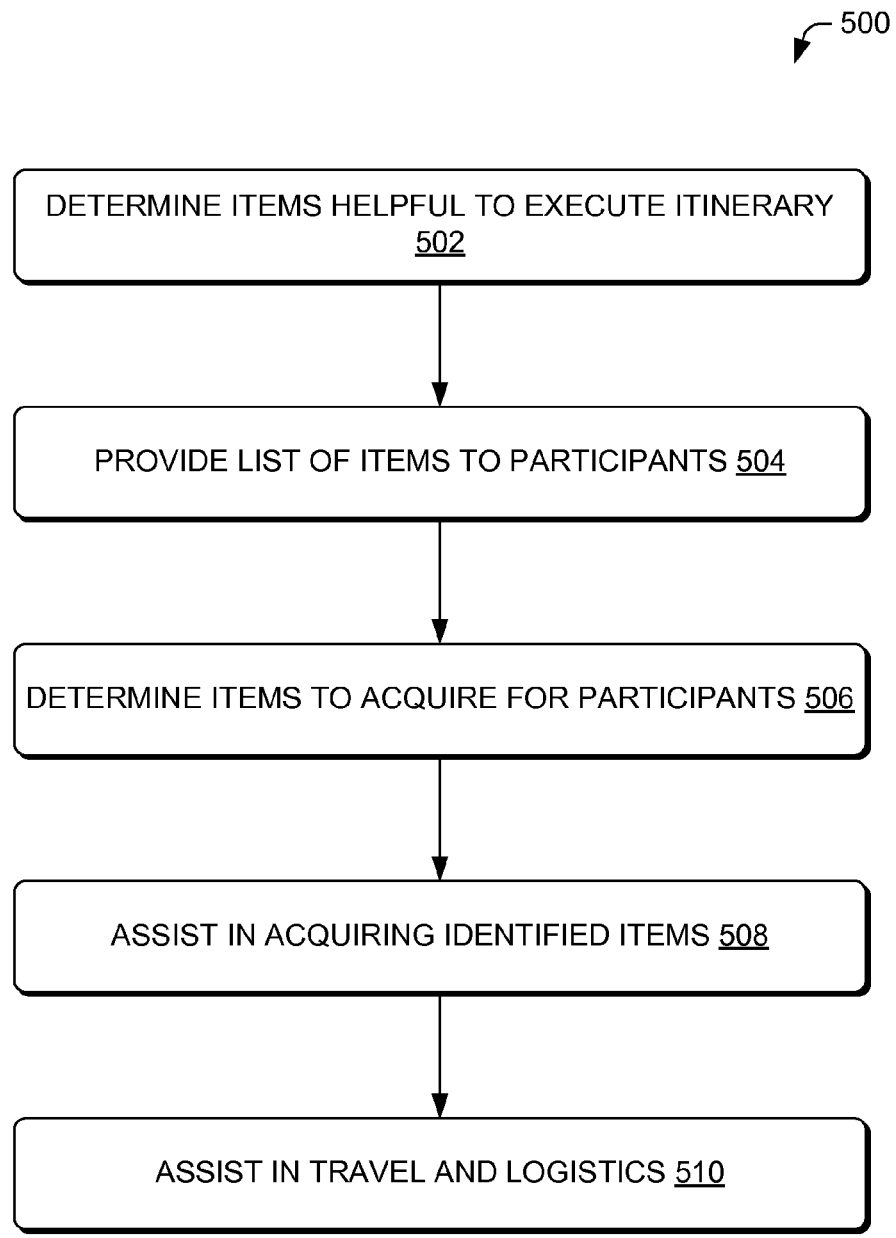
FIG. 5 is a flow diagram of an illustrative process to assist one or more participants in preparation for execution of an itinerary using the electronic concierge.

FIG. 5 is a flow diagram of an illustrative process 500 to assist one or more participants in preparation for execution of an itinerary using the electronic concierge. The process 500 is described with reference to the environment 100 and may be performed by the computing architecture 200. Of course, the process 500 may be performed in other similar and/or different environments.

At 502, the assistant module 226 may determine items that are helpful to execute the itinerary. The assistant module 226 may access information that associates helpful items with particular activities. For example, hiking boots may be associated with hiking while a swimsuit may be associated with a trip to the beach. In some embodiments, collaborative filtering techniques can be used to determine what items are associated with various activities—perhaps based on data gleaned from purchase history, social networking posts, external databases (e.g., travel guides), and so forth.

At 504, the assistant module 226 may provide a listing of the items that are helpful to the participants, possibly in advance of execution of the itinerary. In this way, the participants may have time to obtain and/or pack these items.

At 506, the assistant module 226 may determine items to acquire for the participants. For example, the assistant module 226 may receive input from the user and/or some or all of the group members about items that people desire to acquire. In some embodiments, the assistance module 226 may determine items that are likely in need of acquisition (e.g., need to be purchased, need to be rented, etc.) based on transaction history obtained after user consent and via the data acquisition module 214 and/or from other databases such as an inventory management database, an insurance database, or other repositories. For example, if the user has no purchase history of ski boots, the assistance module 226 may assume the user does not own ski boots. In another example, the assistant module 226 may determine from the user history that the user last purchased hiking boots ten years ago, and thus may suggest that the user purchase new hiking boots.

At 508, the assistant module 226 may assist in acquiring the identified items. For example, the assistant module 226 may initiate an order of one or more items using an electronic marketplace that allows electronic ordering and provides delivery and/or pickup of the items in a location near the user's current or future location. For example, the assistant module 226 may order a pair of hiking boots and have the boots delivered to a hotel that the user plans to stay at before a hike that is included in the itinerary.

At 510, the assistant module 226 may assist the user 106 and/or the group members 108 in travel and logistics before and/or during execution of the itinerary. For example, the assistant module 226 may schedule taxis, locate bus/train routes and schedules, provide walking directions, locate bicycles for rent, and/or assist in other travel arrangement before or during the execution of the itinerary. The assistant module 226 may perform the aforementioned operations at least in part using programmatic interactions with other systems. In some embodiments, the assistant module 226 may identify and recommend cheapest or most convenient parking for activities based on user reviews, map data, advertisements, and/or other data. The assistant module 226 may determine travel preferences based on information from the data acquisition module 214 that may be stored in the participant information datastore.

The assistant module 226 may provide logistic information to help the user and/or the group members to coordinate meeting times, find travel options, find restrooms, and/or provide other logistical information to the user/group members. For example, the assistance module 226 may merge calendar information to coordinate meeting times. The assistance module 226 may search for travel options using search engines and identify restrooms by inspecting electronic maps.

Figure 6:
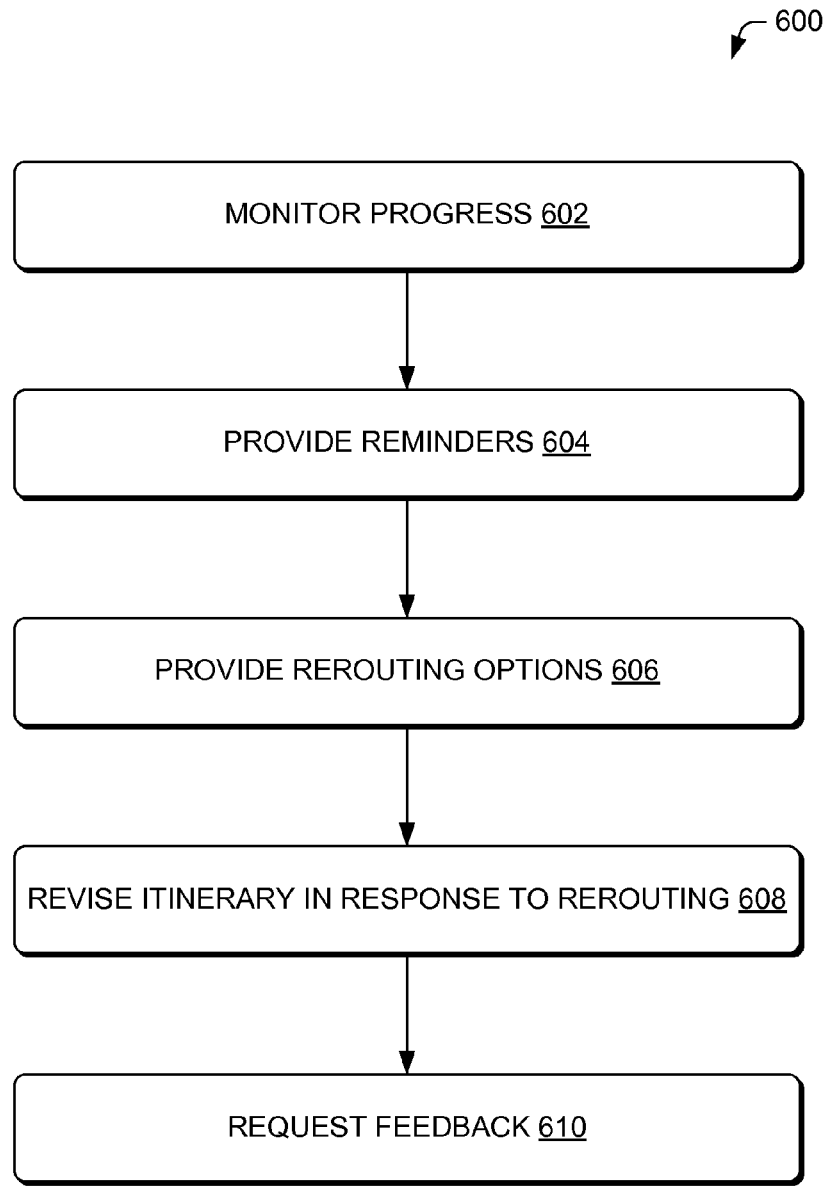
FIG. 6 is a flow diagram of an illustrative process to assist one or more participants during execution of an itinerary using the electronic concierge.

FIG. 6 is a flow diagram of an illustrative process 600 to assist one or more participants during execution of an itinerary using the electronic concierge. The process 600 is described with reference to the environment 100 and may be performed by the computing architecture 200. Of course, the process 600 may be performed in other similar and/or different environments.

At 602, the assistant module 226 may monitor progress of the user 106 and/or the group members 108 during execution of the itinerary. The assistant module 226 may monitor the progress using location information, such as GPS location information, by input from users that indicates the progress, and/or by external data that indicates the progress (redemption of tickets, use of a scheduled driver, etc.), which may be accessed through third parties (ticket vendors, transit services, or others). Thus, the assistant module 226 may monitor the user 106 or the group members 108 by receiving user input or device information associated with action or inaction by the one or more users.

At 604, the assistant module 226 may provide reminders to the user and/or the group members to assist the participants during the execution of the itinerary. The reminders may include notifications of when to perform or end an activity, when to access transportation, and other types of reminders or information. The assistant module 226 may allow the participants to extend an activity, cancel a subsequent activity, replace a subsequent activity, add a new activity, and/or modify a subsequent activity. In such instances, the assistant module 226 may revise the itinerary according, possibly in cooperation with the itinerary creation module 216.

At 606, the assistant module 226 may provide update options and/or rerouting options to requests or changes to the itinerary. For example, when the participants fail to leave an activity on time, the assistant module 226 may delay, if possible, the start of a subsequent activity, arrange suitable transportation, cancel an activity, and/or provide options for the participants in how to modify the itinerary. In some embodiments, the assistant module 226 may provide rerouting options based on other factors such as weather, traffic conditions, user feedback, and/or other data. For example, when the itinerary includes a visit to a beach, but the weather indicates that it is raining at the beach, then the assistant module 226 may provide this information to the participants and solicit feedback about updating or modifying the itinerary accordingly.

At 608, the assistant module 226, possibly in cooperation with the itinerary creation module 216, may revise the itinerary in response to information determined in the operation 606, which may or may not require user input. For example, revising transportation times (e.g., indicating a next time for a bus/train) may not rely on user input while selection of an alternative activity may involve soliciting user input.

At 610, communications module 224 may solicit feedback for the user 106 and/or the group members 108 during or possibly after the activities. The feedback may be used to revise the itinerary using the operations 606 and 608, modify or add to information in the participant information datastore 230 (e.g., add likes/dislikes), and/or add information in the activity datastore 228 such as rating for the activities, reviews by the participants, and/or other information.

Figure 7:
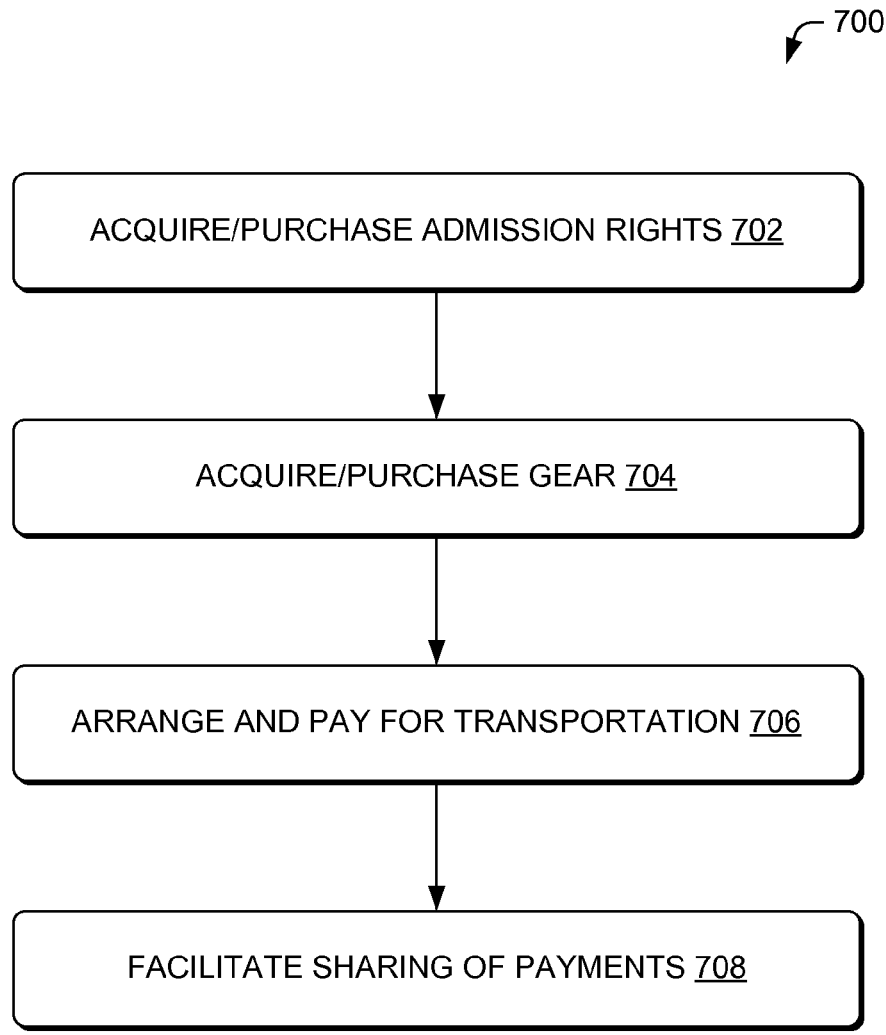
FIG. 7 is a flow diagram of an illustrative process to assist one or more participants with payments associated with the itinerary using the electronic concierge.

FIG. 7 is a flow diagram of an illustrative process 700 to assist one or more participants with payments associated with the itinerary using the electronic concierge. The process 700 is described with reference to the environment 100 and may be performed by the computing architecture 200. Of course, the process 700 may be performed in other similar and/or different environments.

At 702, the payment module 222, possibly in cooperation with the assistant module 226, may acquire and/or purchase admission rights for one or more activities. For example, the payment module 222 may access a user's payment information from the payment datastore 232 and then complete a purchase and/or transfer funds to an account to enable access to an activity. In some embodiments, the payment module 222 may purchase one or more tickets using an online store. In various embodiments, the tickets and/or admission rights may be delivered electronically to the electronic devices 112, which may then be revealed to appropriate personal to gain admission to certain activities. In various embodiments, the payment module 222 may use a service that may or may not be staffed with people to assist in purchasing tickets or otherwise obtaining admission rights to certain activities. For example, the payment module 222 may interact with a travel services company that includes people who book travel, obtain tickets, and perform other tasks or services. The payment module 222 may provide payments to the travel services company, which may then purchase tickets for the user or group members.

At 704, the payment module 222, possibly in cooperation with the assistant module 226, may acquire and/or purchase gear or other helpful items, such as the items identified at the operation 506. The payment module 222 may purchase items using an electronic marketplace, via an outfitter, or using other services which may or may not involve direct human support. In some embodiments, the payment module 222 may provide payments for deposits, rental fees, insurance fees, and/or other types of payments for gear.

At 706, the payment module 222, possibly in cooperation with the assistant module 226, may arrange and/or pay for transportation. The payment module 222 may provide funds to a transportation service that provides transportation to the user and/or the group members. In some embodiments, the payment module 222 may hire and transfer funds to a taxi company or driver or other providers of transportation.

At 708, the payment module 222 may facilitate sharing of payments between the group members 108. For example, when the user 106 pays for other group members, such as by paying for a group admission, paying for everyone's dinner, etc., then the payment module 222 may enable the other group members to reimburse the user 106 by transferring funds to an account associated with the user 106. In some embodiments, the payment module 222 may transfer funds to the user or another person before the user (or the other person) makes a payment on behalf of the other group members.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more processors;
one or more memories;
an activity finder module stored in the one or more memories and executable by the one or more processors to determine activities that are available in a geographic location and to determine information about the activities;
a data acquisition module stored in the one or more memories and executable by the one or more processors to determine preferences of one or more users based on historical transaction information created in part based on activities performed by the one or more users;
an itinerary creation module stored in the one or more memories and executable by the one or more processors to:
determine parameters of an itinerary that include at least the geographic location, a time range, and participants of the itinerary;
recommend one or more activities based at least in part on the parameters, the activities that are available in the geographic location, and the determined preferences of the one or more users;
determine available modes of transportation in the geographic location between the one or more users and the one or more activities;
determine a transportation distance between the one or more users and the one or more activities;

recommend a mode of transportation of the available modes of transportation to create a recommended mode of transportation based on at least one of:
the transportation distance for transporting the one or more users to the one or more activities; or
an estimated time of one or more types of transit to transport the one or more users to the one or more activities;
receive user input to select at least some of the one or more activities;
create an itinerary of activities based at least in part on the user input; and
reserve the recommended mode of transportation; and
an assistant module stored in the one or more memories and executable by the one or more processors to provide assistance to the one or more users as the one or more users participate in the activities included in the itinerary, the assistance including at least information provided about the activities or scheduling of the activities included in the itinerary.

2. The system as recited in claim 1, wherein the assistant module creates a modification to the itinerary as the assistance based on at least one of received user input or device information associated with action or inaction by the one or more users, the modification being at least one of lengthening an activity, canceling a subsequent activity, adding a new activity, or substituting another activity for the subsequent activity.

3. The system as recited in claim 1, wherein the itinerary creation module further arranges for the transportation to be provided and schedules time for the transport to the activities.

4. The system as recited in claim 1, further comprising a payment module stored in the one or more memories and executable by the one or more processors to cause at least one payment to be initiated on behalf of the one or more users for consideration associated with the activities.

5. The system as recited in claim 1, where the itinerary is created for participation by multiple users, and wherein the determined preferences are merged preferences that represent shared preferences of the multiple users.

6. The system as recited in claim 1, wherein the one or more activities to recommend to the one or more users are identified by using the determined preferences of the one or more users to filter a list of activities associated with the geographic location and time range.

7. The system recited in claim 1, and further comprising creating a new recommendation of the mode of the transportation, in response to adding a participant to the itinerary.

8. The system as recited in claim 1, further comprising inspecting an electronic map, identifying a location of a restroom from the electronic map, and presenting the location of the restroom to the one or more users.

9. A method comprising:
receiving, by one or computing devices, a request to create an itinerary for one or more users in a geographic area during a specified time range;
querying, by at least one of the one or computing devices, historical information of the one or more users to determine at least activity preferences for the one or more users, the historical information including at least transaction data associated with an electronic marketplace or interaction data associated with a social network;
identifying, by at least one of the one or computing devices, activities that are available in the geographic area during the specified time range based at least in part on the activity preferences;
creating, by at least one of the one or computing devices, the itinerary that includes at least a portion of the activities, the itinerary including an indication of transportation options to travel to the at least a portion of the activities;
generating a suggested list of gear that is associated with performance of at least one of the activities included in the itinerary, the at least one of the activities comprising an outdoor exercise activity;
providing the list of gear to the one or more users in advance of the at least one of the activities; and
ordering at least one item of gear in the list of gear on behalf of at least one of the one or more users.

10. The method as recited in claim 9, further comprising providing assistance to the one or more users as the one or more users participate in the activities included in the itinerary, and wherein the providing assistance includes modifying the itinerary by at least one of lengthening an amount of time allocated to an activity or substituting a subsequent activity with another activity.

11. The method as recited in claim 9, further comprising providing assistance to the one or more users as the one or more users participate in the activities included in the itinerary, and wherein the providing assistance includes transmitting at least one reminder to one of the one or more users, the reminder to indicate information about a subsequent activity included in the itinerary.

12. The method as recited in claim 9, wherein the request includes creation of the itinerary for multiple users, and wherein the querying historical information is performed to determine shared activity preferences for the multiple users.

13. The method as recited in claim 9, further comprising:
causing a ticket to be acquired to at least one of the activities on behalf of at least one of the one or more of the users; or
causing a reservation to be made for at least one of the activities on behalf of the one or more of the users.

14. The method as recited in claim 9, further comprising causing a mode of transportation to be arranged to at least one of the activities, the mode of transportation based at least in part on the historical information of the one or more users.

15. One or more non-transitory computer-readable media storing computer-executable instructions that, when executed on one or more processors, performs acts comprising:
accessing a request to create an itinerary for a plurality of users in a geographic area during a specified time range;
accessing historical information of the plurality of users to determine activity preferences that are shared by the plurality of users;
identifying activities that are available in the geographic area during the specified time range based at least in part on the activity preferences;
generating a suggested list of gear that is associated with performance of at least one of the activities included in the itinerary;
providing the list of gear to the plurality of users in advance of the at least one of the activities;
reserving for rental at least one item of gear in the list of gear on behalf of at least one of the plurality of users; and
creating the itinerary that includes at least a portion of the activities.

16. The one or more non-transitory computer-readable media as recited in claim 15, wherein the historical information includes transaction history of the users that is based at least in part on items purchased or viewed from an electronic marketplace.

17. The one or more non-transitory computer-readable media as recited in claim 15, wherein the acts further comprise providing assistance to at least one of the plurality of users during execution of the itinerary, the assistance including at least one of providing a reminder about a subsequent activity or modifying the itinerary during execution of the itinerary.

18. The one or more non-transitory computer-readable media as recited in claim 15, wherein the acts further comprise requesting feedback from at least one of the plurality of users after completion of an activity included in the itinerary, the feedback comprising a recorded length of time at least one of the plurality of users is at a location of the activity.

19. The one or more non-transitory computer-readable media as recited in claim 15, wherein the acts further comprise causing a payment to be provided to an entity associated with at least one of the activities on behalf of at least one of the plurality of users.

20. The one or more non-transitory computer-readable media as recited in claim 19, wherein the acts further comprise determining an amount of the payment based at least in part on dividing a total payment to be provided to the entity based on a number of participants that share the total payment.

21. The one or more non-transitory computer-readable media as recited in claim 15, wherein the acts further comprise:
   causing the identified activities to be presented as images to at least one of the plurality of users, the images associated with additional details about respective activities; and
   receiving a selection of one or more of the images, and wherein the creating the itinerary is based at least in part on the received selection of the one or more of the images.

* * * * *